United States Patent
Lee et al.

(10) Patent No.: US 10,366,029 B2
(45) Date of Patent: Jul. 30, 2019

(54) DATA TRANSCEIVING METHOD AND DEVICE

(71) Applicant: SAMSUNG ELECTRONICS CO., LTD., Suwon-si, Gyeonggi-do (KR)

(72) Inventors: Woo Kwang Lee, Suwon-si (KR); Hyuk Kang, Hwaseong-si (KR); Kyoung Hoon Kim, Seoul (KR); Min Jung Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 43 days.

(21) Appl. No.: 15/411,046

(22) Filed: Jan. 20, 2017

(65) Prior Publication Data
US 2017/0235694 A1 Aug. 17, 2017

(30) Foreign Application Priority Data
Feb. 16, 2016 (KR) .................. 10-2016-0017987

(51) Int. Cl.
*G06F 13/12* (2006.01)
*G06F 13/38* (2006.01)
(Continued)

(52) U.S. Cl.
CPC .......... *G06F 13/385* (2013.01); *G06F 13/364* (2013.01); *G06F 13/387* (2013.01);
(Continued)

(58) Field of Classification Search
CPC .. G06F 13/4282; G06F 13/385; G06F 13/387; G06F 13/4022; G06F 13/4081; G06F 2213/0042
(Continued)

(56) References Cited

U.S. PATENT DOCUMENTS 7,788,428 B2   8/2010  Melin
8,151,018 B2   4/2012  Mohanty et al.
(Continued)

FOREIGN PATENT DOCUMENTS

CN          101464849 A      6/2009

OTHER PUBLICATIONS

Extended European Search Report dated May 22, 2017 for Appln. No. 17152368.1.
"Universal Serial Bus Specification Revision 2.0", Apr. 27, 2000, pp. 1-650, XP008147911, Retrieved from the Internet: URL: http://www.usb.org/developers/docs/usb_20_052510.zip.

*Primary Examiner* — Titus Wong
(74) *Attorney, Agent, or Firm* — Nixon & Vanderhye P.C.

(57) ABSTRACT

An electronic device includes a connector, a first communication circuit connected with the connector, a second communication circuit connected with the connector, and a processor. The processor is configured to verify identification information corresponding to an external electronic device connected with the electronic device through the connector, to receive or transmit, if the external electronic device is an electronic device of a first type, data from or to the external electronic device through the first communication circuit and the second communication circuit based on the identification information, and to receive or transmit, if the external electronic device is the electronic device of a second type, data from or to the external electronic device through the first communication circuit based on the identification information.

16 Claims, 9 Drawing Sheets

(51) Int. Cl.
  *G06F 13/364*   (2006.01)
  *G06F 13/40*    (2006.01)
  *G06F 13/42*    (2006.01)
  *G09G 5/00*     (2006.01)
  *H04N 21/41*    (2011.01)

(52) U.S. Cl.
  CPC ...... *G06F 13/4022* (2013.01); *G06F 13/4282* (2013.01); *G09G 5/006* (2013.01); *H04N 21/4122* (2013.01)

(58) Field of Classification Search
  USPC ........................................................ 710/106
  See application file for complete search history.

(56) References Cited

U.S. PATENT DOCUMENTS

| | | | |
|---|---|---|---|
| 8,661,164 B2* | 2/2014 | Chen | G06F 9/4415 |
| | | | 710/10 |
| 9,087,163 B2 | 7/2015 | Amchislaysky et al. | |
| 9,710,406 B2* | 7/2017 | Pethe | G06F 13/102 |
| 2009/0248924 A1 | 10/2009 | Melin | |
| 2011/0087806 A1 | 4/2011 | Mohanty et al. | |
| 2014/0019653 A1 | 1/2014 | Amchislaysky et al. | |
| 2015/0227485 A1 | 8/2015 | Maung et al. | |
| 2016/0127671 A1* | 5/2016 | Hundal | G06F 13/4247 |
| | | | 348/723 |
| 2016/0188506 A1* | 6/2016 | Wang | G06F 13/4282 |
| | | | 710/106 |
| 2017/0286343 A1* | 10/2017 | Rozic | G06F 13/385 |

* cited by examiner

DATA TRANSCEIVING METHOD AND DEVICE

CROSS-REFERENCE TO RELATED APPLICATION

This application is based on and claims priority under 35 U.S.C. § 119 to a Korean patent application filed on Feb. 16, 2016 in the Korean Intellectual Property Office and assigned Serial number 10-2016-0017987, the disclosure of which is incorporated by reference herein in its entirety.

TECHNICAL FIELD

The present disclosure relates generally to a method and a device that transmit and receive data between a plurality of devices.

BACKGROUND

Various electronic devices are being developed as the electronic technologies are advanced. In recent years, portable electronic devices such as cellular phones, tablet PCs, and the like are widely popularized as electronic devices are miniaturized.

The performance of recently popularized portable electronic devices are being improved to store and play high-quality video data, such as high definition (HD) video data, full high definition (FHD) video data, ultra-high definition (UHD) video data, and the like. Furthermore, there is being developed a technique which allows a video stored in the portable electronic device to be played back in real time through a display device (e.g., television) connected with a portable electronic device.

The portable electronic device and the external device may transmit or receive data to or from each other through a specified communication circuit to play a video in real time through an external device. Nowadays, a processing technology of a high-quality video such as a FHD video or an UHD video is being developed. A transmission speed and a processing speed of data need to be guaranteed to seamlessly play video data of a high-quality.

SUMMARY

Aspects of the present disclosure address at least the above-mentioned problems and/or disadvantages. Accordingly, an example aspect of the present disclosure is to provide a data transceiving method that is capable of guaranteeing a data transmission speed and a data processing speed even when high-quality video data is transmitted to an external device, and a device thereof.

In accordance with an example aspect of the present disclosure, an electronic device includes a connector, a first communication circuit connected with the connector, a second communication circuit connected with the connector, and a processor. The processor is configured to verify identification information corresponding to an external electronic device connected with the electronic device through the connector, to receive or transmit, if the external electronic device is an electronic device of a first type, data from or to the external electronic device through the first communication circuit and the second communication circuit based on the identification information, and to receive or transmit, if the external electronic device is the electronic device of a second type, data from or to the external electronic device through the first communication circuit based on the identification information.

In accordance with an example aspect of the present disclosure, a data transceiving method of an electronic device includes verifying a type of an external electronic device connected with the electronic device through a connector, receiving or transmitting, if the external electronic device is an electronic device of a first type, data from or to the external electronic device through a first communication circuit and a second communication circuit, and receiving or transmitting, if the external electronic device is the electronic device of a second type, data from or to the external electronic device through the first communication circuit.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
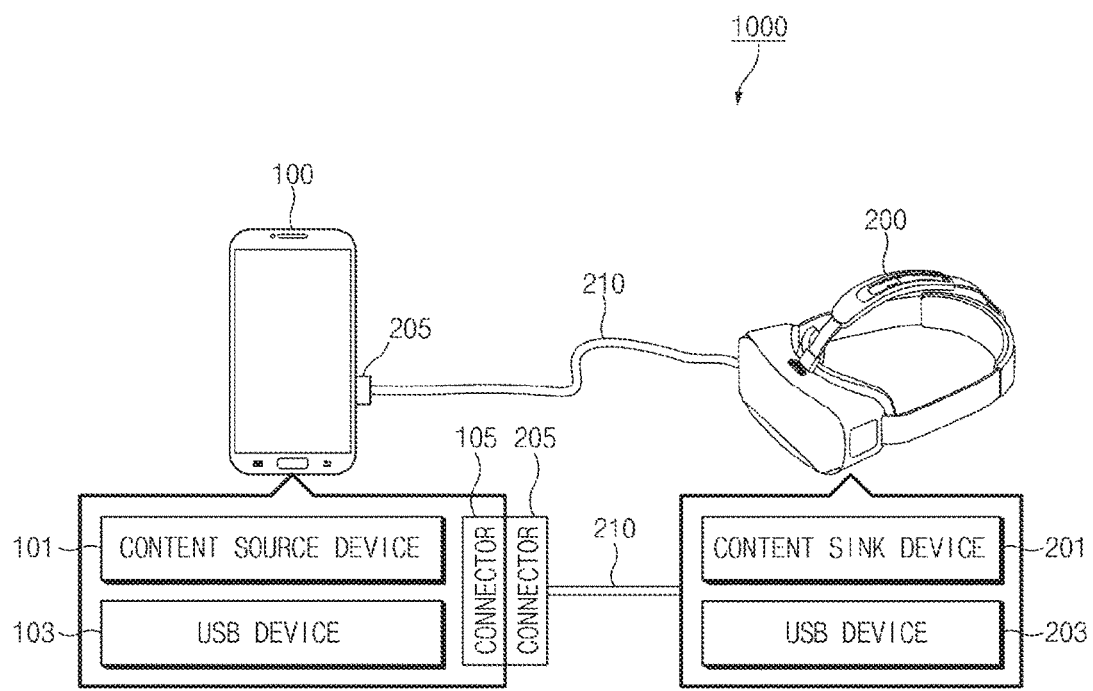
FIG. 1 is a drawing illustrating an example display system, according to various example embodiments of the present disclosure.

Hereinafter, various example embodiments of the present disclosure are disclosed with reference to the accompanying drawings. However, the present disclosure is not intended to be limited by the various example embodiments of the present disclosure to any specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed the existence of functions, operations, or elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may refer, for example, to a situation in which the device is "capable of" operating together with another device or other components. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe example embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various example embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit), or the like, but is not limited thereto.

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to some various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a drawing illustrating an example display system, according to various example embodiments of the present disclosure.

Referring to FIG. 1, a display system 1000 may include a first electronic device 100 and a second electronic device 200. The first electronic device 100 and the second electronic device 200 may be connected through a cable 210 to transmit or receive data to or from each other. According to an embodiment, the cable 210 may be implemented to be separable from the second electronic device 200 or may be integrated with the second electronic device 200. According to an embodiment, the cable 210 may include a connector 205 (e.g., a universal serial bus (USB) connector). According to an embodiment, a cable or the second electronic device 200 may include an adapter function for converting a video signal.

According to an embodiment, the first electronic device 100 may be a portable electronic device such as a smartphone, a tablet PC, or a wearable device (e.g., a smart watch, smart glasses, or the like), or the like, but is not limited thereto. According to an embodiment, the first electronic device 100 may be a source device that transmits content (e.g., a video or an audio).

According to an embodiment, the first electronic device 100 may include a content source device 101, a USB device 103, and a connector 105. According to an embodiment, the content source device 101 may include circuitry configured to generate first data (e.g., high-resolution video data or high-quality audio data) and may transmit the first data to the second electronic device 200 through the connector 105. For example, the content source device 101 may transmit, to second electronic device 200, high-definition video data, such as high definition (HD) video data, full HD (FHD) video data, quad HD (QHD) video data, ultra HD (UHD) video data, and the like. According to an embodiment, the USB device 103 may be connected with the second electronic device 200 through the connector 105 to communicate with the second electronic device 200. For example, the USB device 103 may transmit or receive second data (e.g., sensor data or peripheral device data) to or from the second electronic device 200.

According to an embodiment, the second electronic device 200 may be a device including a display such as a TV, a monitor a laptop PC, or the like, but is not limited thereto. According to an embodiment, the second electronic device 200 may be a head mounted display (HMD). According to an embodiment, the second electronic device 200 may be a docking device (e.g., a docking audio) that is capable of docking the first electronic device 100. According to an embodiment, the first electronic device 200 may be a sink device that receives content (e.g., a video or an audio). According to an embodiment, the second electronic device 200 may be a device that plays or outputs multimedia (e.g., a video or an audio).

According to an embodiment, the second electronic device 200 may include a content sink device 201 comprising content sink circuitry and a USB device 203. According to an embodiment, the content sink device 201 may receive the first data (e.g., high-resolution video data) from the first electronic device 100 through the connector 205 and may output the first data to an embedded or external output device (e.g., a display device or an audio output device), which is electrically connected thereto, in real time. According to an embodiment, the USB device 203 may be connected with the first electronic device 100 through the connector 205 to transmit or receive the second data (e.g., sensor data, peripheral device data, network communication data, or the like) to or from the second electronic device 200. According to an embodiment, the second electronic device 200 may include at least one sensor and/or key module. The second electronic device 200 may collect or generate the second data (e.g., sensor data) through at least one of, for example, an acceleration sensor, a gyro sensor, a proximity sensor, a touch sensor, and the key module (e.g., a back key, a volume key, a power key, and the like). According to an embodiment, the second electronic device 200 may receive the second data (e.g., peripheral device data) from a peripheral device (e.g., an input device such as a mouse, a keyboard, or the like) connected to (or included in) the second electronic device 200. According to an embodiment, the USB device 203 may be connected with the first electronic device 100 through the connector 205 to transmit or receive the second data (e.g., sensor data or peripheral device data) to or from the second electronic device 200.

According to an embodiment, the second electronic device 200 may include a network communication interface (e.g., a local area network (LAN) interface) and may perform network communication (e.g., Ethernet communication) with a third electronic device (not illustrated) through the network communication interface. The second electronic device 200 may transmit or receive network communication data (e.g., Ethernet packet data) to or from the first electronic device 100.

According to an embodiment, the second electronic device 200 may transmit data, which is stored in a memory device (e.g., a USB mass storage device or a hard disk drive) connected to or included in the second electronic device 200, to the first electronic device 100.

According to an embodiment, the first electronic device 100 may generate video data based on sensor data (e.g., motion data of the second electronic device 200) received from the second electronic device 200 and may transmit the generated video data to the second electronic device 200. The second electronic device 200 needs to receive the first data from the first electronic device 100 at a specified speed or higher to seamlessly output the video data received from the first electronic device 100. For example, the second electronic device 200 needs to receive video data at a transmission speed of 240 megabyte (MB)/sec or higher from the first electronic device 100 to play a video of QHD video quality at 60 frames per second (FPS). In addition, sensor data sensed by the second electronic device 200 needs to be transmitted to the first electronic device 100 within a specified time period (e.g., 2 ms) and to be processed. In the case where data transmission and data processing between the first electronic device 100 and the second electronic device 200 is delayed, the delay may occur in a video played in the second electronic device 200 or video data to which sensor data is not applied may be played. The above-mentioned issue may be more remarkable in the case where the data transmission and the data processing are performed by one communication circuit (or a communication interface). Furthermore, the above-mentioned issue may be more remarkable in the case where the second electronic device 200 needs to transmit data or network communication data, which is stored in a memory device, to the first electronic device 100 while the second electronic device 200 receives video data from the first electronic device 100. The first electronic device 100 according to an embodiment of the present disclosure may independently process the first data and the second data by transmitting or receiving the first data and the second data through different communication circuits.

Figure 2:
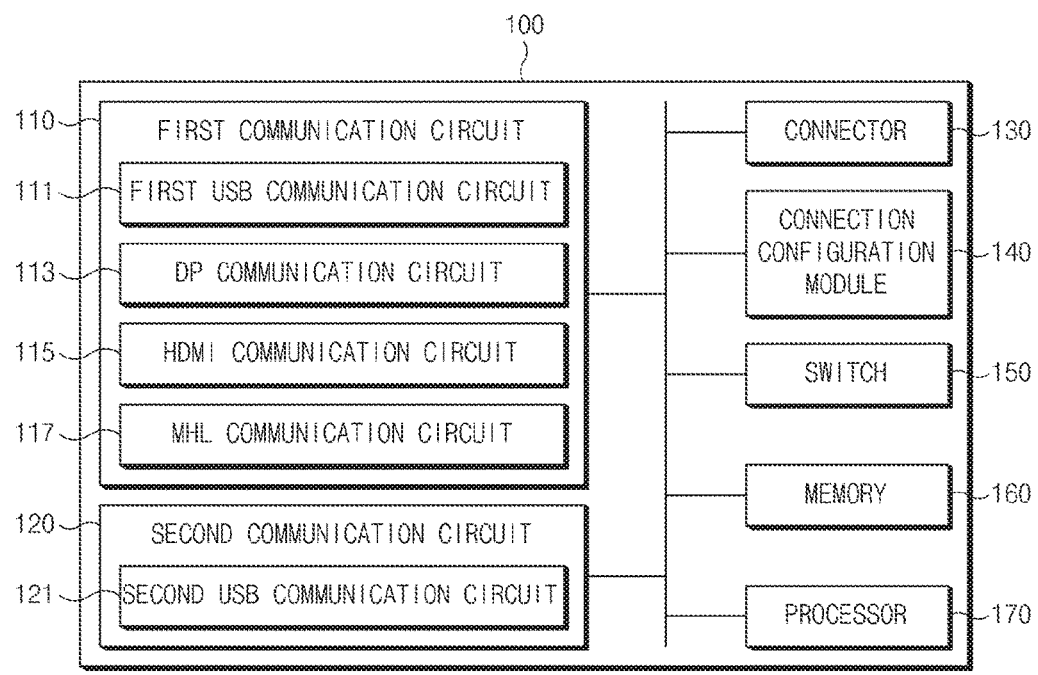
FIG. 2 is a block diagram illustrating an example configuration of a first electronic device, according to various embodiments of the present disclosure.

FIG. 2 is a block diagram illustrating an example configuration of a first electronic device, according to various example embodiments of the present disclosure.

Referring to FIG. 2, the first electronic device 100 may include a first communication circuit 110, a second communication circuit 120, a connector 130, a connection configuration module 140, a switch 150, a memory 160, and a processor (e.g., an application processor (AP)) 170.

According to an embodiment, the first communication circuit 110 including various communication circuits and may be a communication circuit that transmits first data (e.g., video data or audio data). According to an embodiment, the first communication circuit 110 may transmit the first data to the second electronic device 200 under control of the processor 170. According to an embodiment, the first communication circuit 110 may establish a first communication channel for transmitting the first data to the second electronic device 200. According to an embodiment, the first communication circuit 110 may include various communication circuitry, such as, for example, and without limitation, at least one of a first USB communication circuit 111, a display port (or an embedded display port) (DP) communication circuit 113, a high definition multimedia interface (HDMI) communication circuit 115, a video graphics array (VGA) communication circuit (not illustrated), a digital visual interface (DVI) communication circuit (not illustrated), and a mobile high definition link (MHL) communication circuit 117. According to an example embodiment, the first communication circuit 110 may be included in the processor (e.g., the application processor) 170.

According to an embodiment, the first USB communication circuit 111 may transmit the first data (e.g., video data) to the second electronic device 200. According to an embodiment, the first USB communication circuit 111 may be connected with the connector 130 (e.g., a USB connector). According to an embodiment, if the connector 130 is connected with a connector included in the second electronic device 200, the first USB communication circuit 111 may transmit the first data to the second electronic device 200 through the connector 130. According to an embodiment, the first USB communication circuit 111 may include a USB controller and a USB physical layer (PHY). The USB controller may include, for example, a USB 3.x (indicating version 3.0 or higher) controller supporting a super speed or a USB 2.x (indicating version 2.0 or higher) controller supporting a high speed. The USB PHY may include at least one of, for example, a USB 3.x PHY or a USB 2.x PHY.

According to an embodiment, the DP communication circuit 113 may transmit the first data to the second electronic device 200. According to an embodiment, the DP communication circuit 113 may be connected with the connector 130 (e.g., a USB connector). According to an embodiment, if the connector 130 is connected with the connector included in the second electronic device 200, the DP communication circuit 113 may transmit the first data to the second electronic device 200 through the connector 130. According to an embodiment, the DP communication circuit 113 may transmit video data, which is converted into a DP signal, to the second electronic device 200.

According to an embodiment, the HDMI communication circuit 115 may transmit the first data to the second electronic device 200. According to an embodiment, the HDMI communication circuit 115 may be connected with the connector 130 (e.g., a USB connector). According to an embodiment, if the connector 130 is connected with the connector included in the second electronic device 200, the HDMI communication circuit 115 may transmit the first data to the second electronic device 200 through the connector 130. According to an embodiment, the HDMI communication circuit 115 may transmit video data, which is converted into a HDMI signal, to the second electronic device 200.

According to an embodiment, the MHL communication circuit 117 may transmit the first data to the second electronic device 200. According to an embodiment, the MHL communication circuit 117 may be connected with the connector 130 (e.g., a USB connector). According to an embodiment, if the connector 130 is connected with the connector included in the second electronic device 200, the HDMI communication circuit 117 may transmit the first data to the second electronic device 200 through the connector 130. According to an embodiment, the MHL communication circuit 117 may transmit video data, which is converted into an MHL signal, to the second electronic device 200. The video data may be converted into, for example, the MHL signal after converted the HDMI signal.

According to an embodiment, the second communication circuit 120 may be a communication circuit that transmits or receives second data (e.g., sensor data, peripheral device data, network communication data, or the like) to or from the second electronic device 200. According to an embodiment, the second communication circuit 120 may transmit or receive the second data to or from the second electronic device 200 under control of the processor 170. According to an embodiment, the second communication circuit 120 may establish a second communication channel for transmitting the second data to the second electronic device 200. According to an embodiment, the second communication circuit 120 may include various communication circuitry, such as, for example, and without limitation, a second USB communication circuit 121.

According to an embodiment, the second USB communication circuit 121 may transmit or receive the second data to or from the second electronic device 200. According to an embodiment, the second USB communication circuit 121 may be connected with the connector 130 (e.g., a USB connector). According to an embodiment, if the connector 130 is connected with the connector included in the second electronic device 200, the second USB communication circuit 121 may transmit or receive the second data to or from the second electronic device 200 through the connector 130. According to an embodiment, the second USB communication circuit 121 may include a USB controller and a USB PHY. The USB controller may include, for example, a USB 3.x (indicating version 3.0 or higher) controller supporting a super speed or a USB 2.x (indicating version 2.0 or higher) controller supporting a high speed. The USB PHY may include at least one of, for example, a USB 3.x PHY or a USB 2.x PHY. According to an embodiment, each of the first USB communication circuit 111 and the second USB communication circuit 121 may include a USB controller of a version the same as or different from each other.

According to an embodiment, if the connector 130 is connected with a connector of an external electronic device (e.g., the second electronic device 200), the connector 130 may include at least one pin for transmitting or receiving data. According to an embodiment, at least one pin included in the connector 130 may make contact with at least one pin included in a connector of the external electronic device to form a contact for transmitting or receiving data. According to an embodiment, the connector 130 may transmit or receive the first and second pieces of data through different pins, respectively. For example, the connector 130 may transmit the first data through the first data pin (e.g., Tx+ pin or Tx– pin) and may transmit or receive the second data through a second data pin (e.g., D+ pin or D– pin).

According to an embodiment, the connector 130 may be a USB type-C connector that is specified in the USB specification. The USB type-C connector may provide an alternate mode based on the specification. Hereinafter, the case in which at least some of the connector 130 is used for data transmission based on a protocol different from a USB standard protocol is referred to as an "alternate mode connection" of the connector 130. According to an embodiment, if a specified device (e.g., the second electronic device 200) is connected to the connector 130, the connection configuration module 140 may make the alternate mode connection with the connected device. For example, if a non-USB device (e.g., the second electronic device 200) is connected to an electronic device, the electronic device may make the alternate mode connection through the connector 130.

According to an embodiment, if the external electronic device is connected to the connector 130, the connector 130 may perform a process for operating in the alternate mode. According to an embodiment, the first electronic device 100 may include the connection configuration module 140 (e.g., a configuration channel (CC) integrated circuit (IC)) that controls an operation of the connector 130. According to an embodiment, the connection configuration module 140 may be manufactured with a chip independent of the processor 170 or may be included in the processor 170.

According to an embodiment, the connection configuration module 140 may transmit a discovery identity message to the external electronic device through some of pins (e.g., CC pin) of the connector 130. According to an embodiment, the connection configuration module 140 may receive a response message (ack) associated with the discovery identity message from the external electronic device. According to an embodiment, if the response message is received, the connection configuration module 140 may transmit a discovery standard vendor identifier (SVID) message to the external electronic device. According to an embodiment, the connection configuration module 140 may receive vendor identification information (e.g., a vendor identifier (VID)) from the external electronic device. The vendor identification information may include, for example, whether to support the DP, whether to support to the MHL, and vendor information. According to an embodiment, if the vendor identification information is received from the external electronic device, the connection configuration module 140 may request a vendor defined message (VDM) from the external electronic device. According to an embodiment, the connection configuration module 140 may receive the VDM from the external electronic device. The VDM may include, for example, information, which makes it possible to identify the external electronic device, such as a product identifier (PID).

According to an embodiment, the connection configuration module 140 may determine whether the external electronic device is a specified device (e.g., the second electronic device 200 or the content sink device 201) by using information (e.g., the VID or the PID) received from the external electronic device. According to an embodiment, if the external electronic device is the specified device, the connection configuration module 140 may transmit information about the external electronic device to the switch 150 and the processor 170. According to an embodiment, the connection configuration module 140 may broadcast information (e.g., the VID or the PID) about the external electronic device. For example, the connection configuration module 140 may transmit information about the external electronic device to each element (e.g., the switch 150 or the processor 170) included in the first electronic device 100 in a broadcasting manner.

According to an embodiment, if the VDM is received from the external electronic device, the connection configuration module 140 may transmit a mode entrance message (e.g., an enter mode message) to the external electronic device. According to an embodiment, if the response (ack) to the mode entrance message is received from the external electronic device, the connection configuration module 140 may allow the connector 130 to complete an alternate mode entrance process and to operate in the alternate mode. According to an embodiment, the processor 170 may transmit the first data to the second electronic device 200 by using the first communication circuit 110 in the alternate mode.

According to an embodiment, if the specified device (e.g., the second electronic device 200) is connected to the connector 130, the processor 170 may perform USB enumeration by using the second communication circuit 120. For example, if the specified device (e.g., the second electronic device 200) is connected to the connector 130, the processor 170 may make a USB connection by using the second communication circuit 120. According to an embodiment, the processor 170 may transmit or receive the second data to or from the second electronic device 200 through the second communication circuit 120. That is, as in the second electronic device 200 of FIG. 1, if an electronic device including both a non-USB device and a USB device is connected to the connector 130, the connector 130 may make the alternate mode connection for transmitting the first data by using the first communication circuit 110 and may make the USB connection for transmitting the second data by using the second communication circuit 120 at the same time. Hereinafter, a mode in which the first electronic device 100 simultaneously makes the alternate mode connection and the USB connection is referred to as the "alternate mode".

According to an embodiment, if the response to the mode entrance message is not received from the external electronic device, the connection configuration module 140 may complete the alternate mode entrance process without making the alternate mode connection. According to an embodiment, if the alternate mode connection is not made, the processor 170 may perform the USB enumeration by using the first communication circuit 110. For example, if the external electronic device is not the specified device (e.g., in the case where the external electronic device includes only a USB device), the processor 170 may make the USB connection by using the second communication circuit 120. Hereinafter, a mode in which the first electronic device 100 makes only the USB connection is referred to as a "USB mode". According to an embodiment, the processor 170 may transmit or receive the first data and the second data to the second electronic device 200 by using the first communication circuit 110 in the USB mode.

According to an embodiment, if a connector of the external electronic device is connected to the connector 130, the connection configuration module 140 may recognize a pull-down resistor to supply a specified voltage (e.g., 5 V) to a USB connector of the external electronic device or the external electronic device through some of pins (e.g., Vbus) of the connector 130. The USB connector of the external electronic device may be activated by a voltage received from the connector 130 of, for example, the first electronic device 100. According to an embodiment, after the connector 130 enters the alternate mode, the connection configuration module 140 may supply a power (or a voltage) to the USB connector included in the external electronic device (e.g., the second electronic device 200) by using Vconn.

According to an embodiment, the switch 150 may change a path for transmitting or receiving data based on a type of the external electronic device connected to the connector 130. For example, the switch 150 may connect one of the first communication circuit 110 or the second communication circuit 120 to the second data pin (e.g., D+ pin or D− pin) for transmitting or receiving the second data based on a type of the external electronic device connected to the connector 130. According to an embodiment, the switch 150 may change a path for transmitting or receiving the second data based on information about the external electronic device received from the connection configuration module 140. According to an embodiment, if the specified external electronic device (e.g., the second electronic device 200) is connected to the connector 130, the switch 150 may connect the second data pin of the connector 130 to the second communication circuit 120 (e.g., the second USB communication circuit 121). According to an embodiment, if the external electronic device is not connected to the connector 130 or if another electronic device (e.g., USB memory device) other than the specified external electronic device is connected to the connector 130, the switch 150 may connect the second data pin of the connector 130 to the first communication circuit 110 (e.g., the first USB communication circuit 111). Operations each of which changes a path of the switch 150 may be performed under control of the processor 170.

According to an embodiment, the memory 160 may store content (e.g., a video or an audio). According to an embodiment, the memory 160 may include a first memory and a second memory. According to an embodiment, the first memory may be a nonvolatile memory. For example, the first memory may be a flash memory. For example, the first memory may include an embedded multimedia card (eMMC), universal flash storage (UFS), or a secure digital (SD) card. According to an embodiment, the first memory may store system data (e.g., an operating system (OS), a kernel, or the like), a software driver (e.g., a display driver, a USB driver, a HDCP driver, or the like), and content data (e.g., video data or audio data). According to an embodiment, the second memory may be a volatile memory. For example, the second memory may be a random access memory (RAM). According to an embodiment, the second memory may include at least one buffer. According to an embodiment, the at least one buffer may temporarily store data generated (or of which an area is designated) by the processor 170.

According to an embodiment, the processor 170 (e.g., application processor) may control overall operations of the first electronic device 100. For example, the processor 170 may control each of the first communication circuit 110, the second communication circuit 120, the connector 130, the connection configuration module 140, the switch 150 and the memory 160 such that the first electronic device 100 transmits or receives video data and additional data to or from the second electronic device 200 according to various example embodiments of the present disclosure.

Figure 3:
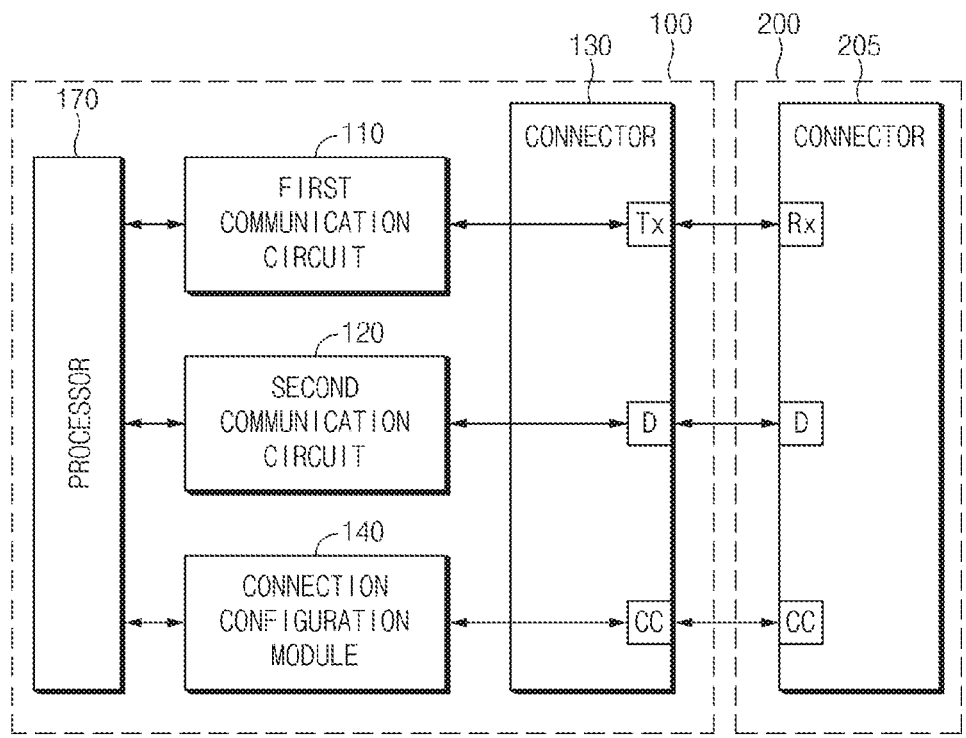
FIG. 3 is a block diagram illustrating an example of a first electronic device, according to various example embodiments of the present disclosure.

FIG. 3 is a block diagram illustrating an example of a first electronic device, according to various example embodiments of the present disclosure.

Referring to FIG. 3, the first electronic device 100 may include the first communication circuit 110, the second communication circuit 120, the connector 130, the connection configuration module 140, and the processor 170.

According to an embodiment, if a specified device (e.g., the second electronic device 200) is connected to the connector 130 included in the first electronic device 100, the connector 130 may operate in an alternate mode. According to an embodiment, if an external electronic device is connected to the connector 130, the connection configuration module 140 may receive information about the external electronic device through a third data pin (e.g., CC pin) of the connector 130. According to an embodiment, the connection configuration module 140 may determine whether the external electronic device is the specified device (e.g., the second electronic device 200), by using information (e.g., a VDM, a PID, or the like) received from the external electronic device. According to an embodiment, if the external electronic device is the specified device, the connection configuration module 140 may provide notification that the specified device (e.g., the second electronic device 200) is connected to the processor 170. For example, the connection configuration module 140 may transmit information about the second electronic device 200 in a broadcasting manner.

According to an embodiment, a first data pin (e.g., Tx pin) of the connector 130 included in the first electronic device 100 may make contact with the first data pin (e.g., Rx pin) of the connector 205 included in the second electronic device 200 to form a contact for transmitting first data (e.g., video data). According to an embodiment, a second data pin (e.g., D+ data pin or D− data pin) of the connector 130 included in the first electronic device 100 make contact with the second data pin of the USB connector 205 included in the second electronic device 200 to form a contact for receiving additional data (e.g., sensor data, or the like).

According to an embodiment, if information about the specified device is received from the connection configuration module 140, the processor 170 may activate (or initialize) the first communication circuit 110. According to an embodiment, the processor 170 may activate at least some of a plurality of communication circuits (e.g., the first USB communication circuit 111, the DP communication circuit 113, the HDMI communication circuit 115, and the MHL communication circuit 117), which is included in the first communication circuit 110, based on the received information. According to an embodiment, the processor 170 may transmit the first data to the first communication circuit 110. According to an embodiment, the first communication circuit 110 may transmit the first data to the second electronic device 200 through the first data pin (e.g., Tx pin) of the connector 130.

According to an embodiment, if information about the specified device is received from the connection configuration module 140, the processor 170 may activate (or initialize) the second communication circuit 120. For example, if the information about the specified device is received from the connection configuration module 140, the processor 170 may perform USB enumeration by using the second communication circuit 120 to activate the second communication circuit 120. According to an embodiment, the processor 170 may transmit or receive the second data to or from the second electronic device 200 by using the second communication circuit 120. According to an embodiment, the second communication circuit 120 may transmit or receive the second data to or from the second electronic device 200 through the second data pin (e.g., D+ data pin or D− data pin) of the connector 130.

Figure 4:
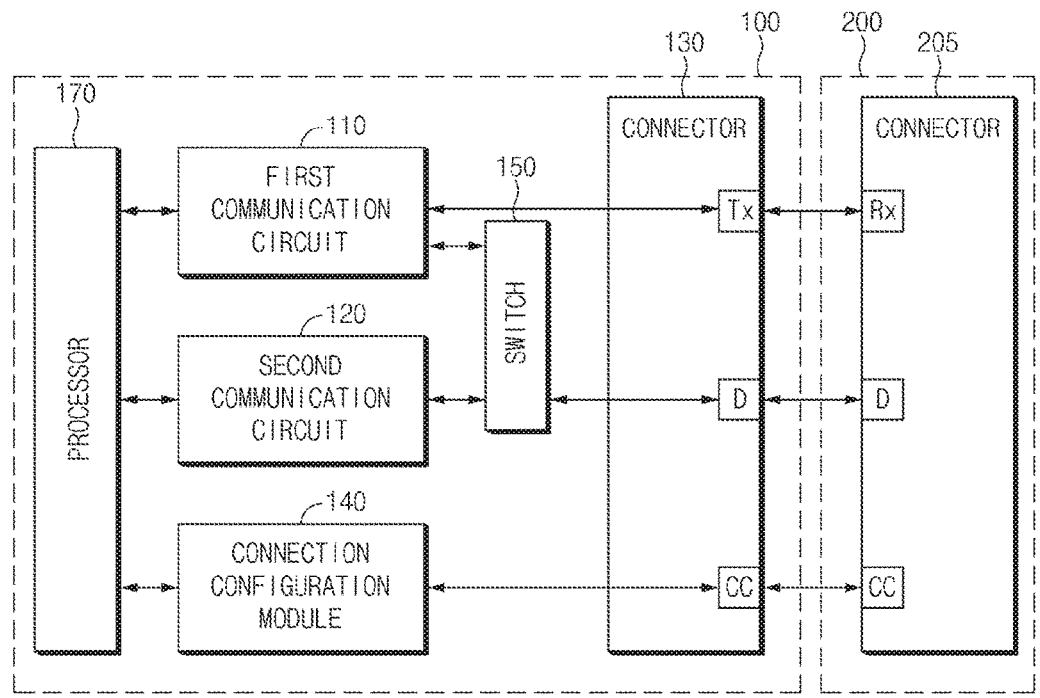
FIG. 4 is a block diagram illustrating an example of a first electronic device, according to various example embodiments of the present disclosure.

FIG. 4 is a block diagram illustrating an example of a first electronic device, according to various example embodiments of the present disclosure.

Referring to FIG. 4, the first electronic device 100 may include the first communication circuit 110, the second communication circuit 120, the connector 130, the connection configuration module 140, the switch 150, and the processor 170.

According to an embodiment, if a specified device (e.g., the second electronic device 200) is connected to the connector 130 included in the first electronic device 100, the connector 130 may operate in an alternate mode. According to an embodiment, if an external electronic device is connected to the connector 130, the connection configuration module 140 may receive information about the external electronic device through a third data pin (e.g., CC pin) of the connector 130. According to an embodiment, the connection configuration module 140 may determine whether the external electronic device is the specified device (e.g., the second electronic device 200), by using information (e.g., a VDM, a PID, or the like) received from the external electronic device. According to an embodiment, if the external electronic device is the specified device, the connection configuration module 140 may provide notification that the specified device (e.g., the second electronic device 200) is connected to the switch 150 and the processor 170. For example, the connection configuration module 140 may transmit information about the second electronic device 200 in a broadcasting manner.

According to an embodiment, a first data pin (e.g., Tx pin) of the connector 130 included in the first electronic device 100 may make contact with the first data pin (e.g., Rx pin) of the connector 205, which is included in the second electronic device 200, to form a contact for transmitting first data (e.g., video data). According to an embodiment, a second data pin (e.g., D+ data pin or D− data pin) of the connector 130 included in the first electronic device 100 make contact with the second data pin of the USB connector 205, which is included in the second electronic device 200, to form a contact for receiving additional data (e.g., sensor data, or the like).

According to an embodiment, if information about the specified external electronic device (e.g., the second electronic device 200) is received from the connection configuration module 140, the switch 150 may connect the second data pin (e.g., D+ data pin or D− data pin) of the connector 130 to the second communication circuit 120 (e.g., the second USB communication circuit 121). According to an embodiment, if the external electronic device is not connected to the connector 130 or if information about another electronic device (e.g., USB memory device) other than the specified external electronic device is received, the switch 150 may connect the second data pin of the connector 130 to the first communication circuit 110 (e.g., the first USB communication circuit 111).

According to an embodiment, if information about the specified device is received from the connection configuration module 140, the processor 170 may activate the first communication circuit 110. According to an embodiment, the processor 170 may activate at least some of a plurality of communication circuits (e.g., the first USB communication circuit 111, the DP communication circuit 113, the HDMI communication circuit 115, and the MHL communication circuit 117), which is included in the first communication circuit 110, based on the received information. According to an embodiment, the processor 170 may transmit the first data to the first communication circuit 110.

According to an embodiment, the first communication circuit 110 may transmit the first data to the second electronic device 200 through the first data pin (e.g., Tx pin) of the connector 130.

According to an embodiment, if information about the specified device is received from the connection configuration module 140, the processor 170 may activate the second communication circuit 120. For example, if information about the specified device is received from the connection configuration module 140, the processor 170 may perform USB enumeration by using the second communication circuit 120 to activate the second communication circuit 120. According to an embodiment, the processor 170 may transmit or receive the second data to or from the second electronic device 200 by using the second communication circuit 120. According to an embodiment, the second communication circuit 120 may transmit or receive the second data to or from the second electronic device 200 through the second data pin (e.g., D+ data pin or D− data pin) of the connector 130.

According to an embodiment described with reference to FIG. 4, it is described that the switch 150 is placed outside of the processor 170. However, the switch 150 may be implemented to be included in the processor 170 together with the first communication circuit 110 and the second communication circuit 120.

According to various example embodiments of the present disclosure, an electronic device may include a connector, a first communication circuit connected with the connector, a second communication circuit connected with the connector, and a processor. The processor is configured to verify identification information corresponding to an external electronic device connected with the electronic device through the connector, to receive or transmit, if the external electronic device is an electronic device of a first type, data from or to the external electronic device through the first communication circuit and the second communication circuit based on the identification information, and to receive or transmit, if the external electronic device is the electronic device of a second type, data from or to the external electronic device through the first communication circuit based on the identification information.

According to an example embodiment, the electronic device may further include a connection configuration module operatively connected with a configuration channel pin of the connector, wherein the processor is configured to verify a type of the external electronic device based on the identification information received from the connection configuration module.

According to an example embodiment, the connector may include a universal serial bus (USB) connector.

According to an example embodiment, the first communication circuit may include a first channel and a second channel that are capable of communicating with the external electronic device, and the processor may be configured to transmit first data to the external electronic device by using the first channel and to transmit or receive second data to or from the external electronic device by using the second channel.

According to an example embodiment, the second communication circuit may include one channel that is capable of communicating with the external electronic device, and the processor may be configured to receive second data from the external electronic device and to transmit second data to the external electronic device, by using the one channel.

According to an example embodiment, the electronic device of the first type may include a device that plays or outputs multimedia, and the electronic device of the second type may include a USB device.

According to an example embodiment, the connector may include a first pin set and a second pin, which are used to receive or transmit data, and the processor may be configured to if the external electronic device is the electronic device of the first type, connect the first pin set to the first communication circuit and the second pin to the second communication circuit respectively by using at least one switch and if the external electronic device is the electronic device of the second type, connect the first pin set and the second pin to the first communication circuit by using the at least one switch.

According to an example embodiment, the processor may be configured to determine a mode for connection with the external electronic device as a first mode if the external electronic device is the electronic device of the first type and determine the mode for connection as a second mode if the external electronic device is the electronic device of the second type.

According to an example embodiment, the first mode may include an alternate mode, and the second mode may include a USB mode.

According to an example embodiment, the processor may be configured to perform a USB enumeration process with the external electronic device by using the first communication circuit if the mode for connection is the USB mode.

According to an embodiment, the processor may be configured to perform a USB enumeration process with the external electronic device by using the second communication circuit if the mode for connection is the alternate mode.

According to an example embodiment, the processor may be configured to transmit first data through the first communication circuit and to receive and transmit second data through the second communication circuit, if the external electronic device is the electronic device of the first type.

According to an example embodiment, the first data may be video data, the second data may be motion data of the external electronic device, and the processor may be configured to generate the video data based on the motion data.

Figure 5:
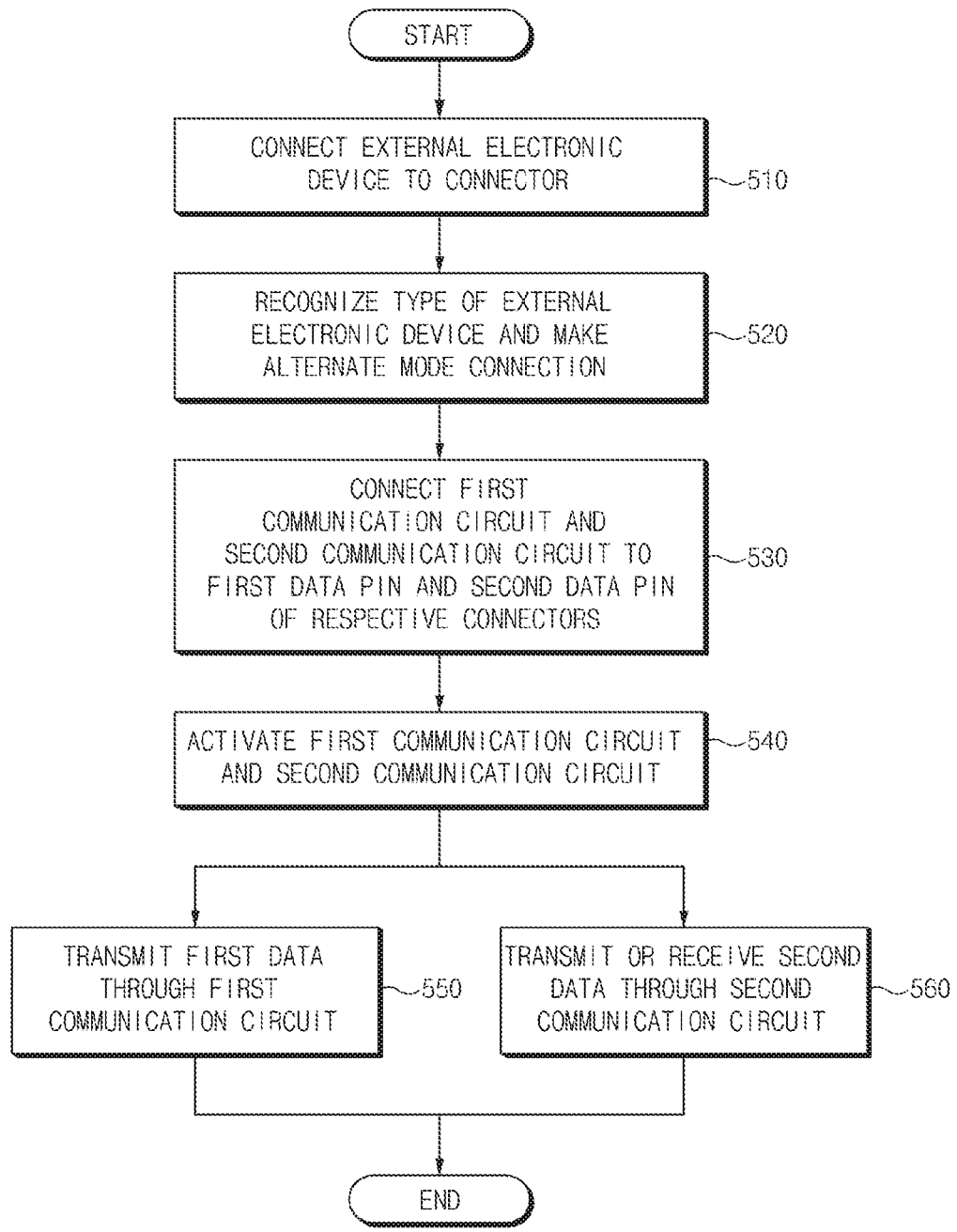
FIG. 5 is a flowchart illustrating an example data transceiving method of a first electronic device, according to various example embodiments of the present disclosure.

FIG. 5 is a flowchart illustrating an example data transceiving method of a first electronic device, according to various example embodiments of the present disclosure.

The flowchart illustrated in FIG. 5 may include operations processed in the first electronic device 100 illustrated in FIG. 2. Thus, even though omitted below, a description about the first electronic device 100 described with reference to FIGS. 1 to 4 may be applied to the flowchart illustrated in FIG. 5.

According to an example embodiment, in operation 510, an external electronic device (e.g., the second electronic device 200) may be connected to a connector of the first electronic device 100. The first electronic device 100 and the second electronic device 200 may be connected with each other through a cable (e.g., the cable 210 of FIG. 1) connected with the second electronic device 200. For example, the cable may be implemented to be separable from the second electronic device 200 or may be integrated with the second electronic device 200. According to an embodiment, the cable may include a connector (e.g., the connector 205 of FIG. 1). A USB connector may be, for example, a USB Type-C connector.

According to an embodiment, in operation 520, the first electronic device 100 (e.g., the connection configuration module 140) may recognize a type of the external electronic device to make an alternate mode connection. According to an embodiment, the first electronic device 100 may receive device information from the external electronic device. For example, if the external electronic device is connected to the first electronic device 100, the first electronic device 100 may receive information (e.g., a VID, a PID, or the like) about the external electronic device from the external electronic device in a process for the alternate mode connection. According to an embodiment, the first electronic device 100 may determine whether the external electronic device is a specified device (e.g., the second electronic device 200), by using the received information. According to an embodiment, if the external electronic device is the specified device, the first electronic device 100 may transmit information about the external electronic device to the switch 150 and the processor 170. According to an embodiment, the first electronic device 100 may transmit a mode entrance message to the external electronic device to operate in an alternate mode if a response to the mode entrance message is received.

According to an embodiment, in operation 530, the first electronic device 100 (e.g., the switch 150) may connect the first communication circuit 110 and the second communication circuit 120 to a first data pin (e.g., Tx+ data pin or Tx− data pin) and a second data pin (e.g., D+ data pin or D− data pin) of connectors, respectively. According to an embodiment, the first electronic device 100 may change a communication circuit, to which the second data pin of the connector 130 is connected, based on a type of the external electronic device connected to the connector 130. According to an embodiment, if the specified external electronic device (e.g., the second electronic device 200) is connected to the connector 130, the first electronic device 100 may connect the second data pin of the connector 130 to the second communication circuit 120 (e.g., the second USB communication circuit 121). According to an embodiment, if the external electronic device is not connected to the connector 130 or if another electronic device (e.g., USB memory device) other than the specified external electronic device is connected to the connector 130, the switch 150 may connect the second data pin of the connector 130 to the first communication circuit 110 (e.g., the first USB communication circuit 111).

According to an embodiment, in operation 540, the first electronic device 100 (e.g., the processor 170) may activate (or initialize) the first communication circuit 110 and the second communication circuit 120. For example, the first electronic device 100 may activate the first communication circuit 110 and may activate a module that generates (or processes) first data. As another example, the first electronic device 100 may activate the second communication circuit 120 to make a USB connection with the external electronic device by performing USB enumeration.

According to an embodiment, in operation 550, the first electronic device 100 (e.g., the processor 170) may transmit the first data through the first communication circuit 110. The first data may be transmitted to the external electronic device through, for example, the first communication circuit 110 and the first data pin of the connector 130.

According to an embodiment, in operation 560, the first electronic device 100 (e.g., the processor 170) may transmit or receive second data through the second communication circuit 120. The second data may be transmitted or received through, for example, the second communication circuit 120 and the second data pin of the connector 130.

According to an embodiment, if data associated with the first data (e.g., sensor data associated with motion of the external electronic device) is received from the external electronic device, the first electronic device 100 (e.g., the processor 170) may generate the first data based on the received data. For example, in the case where the external electronic device is a HMD, the first electronic device 100 may generate video data corresponding to motion of the HMD and may transmit the video data to the external electronic device.

Figure 6:
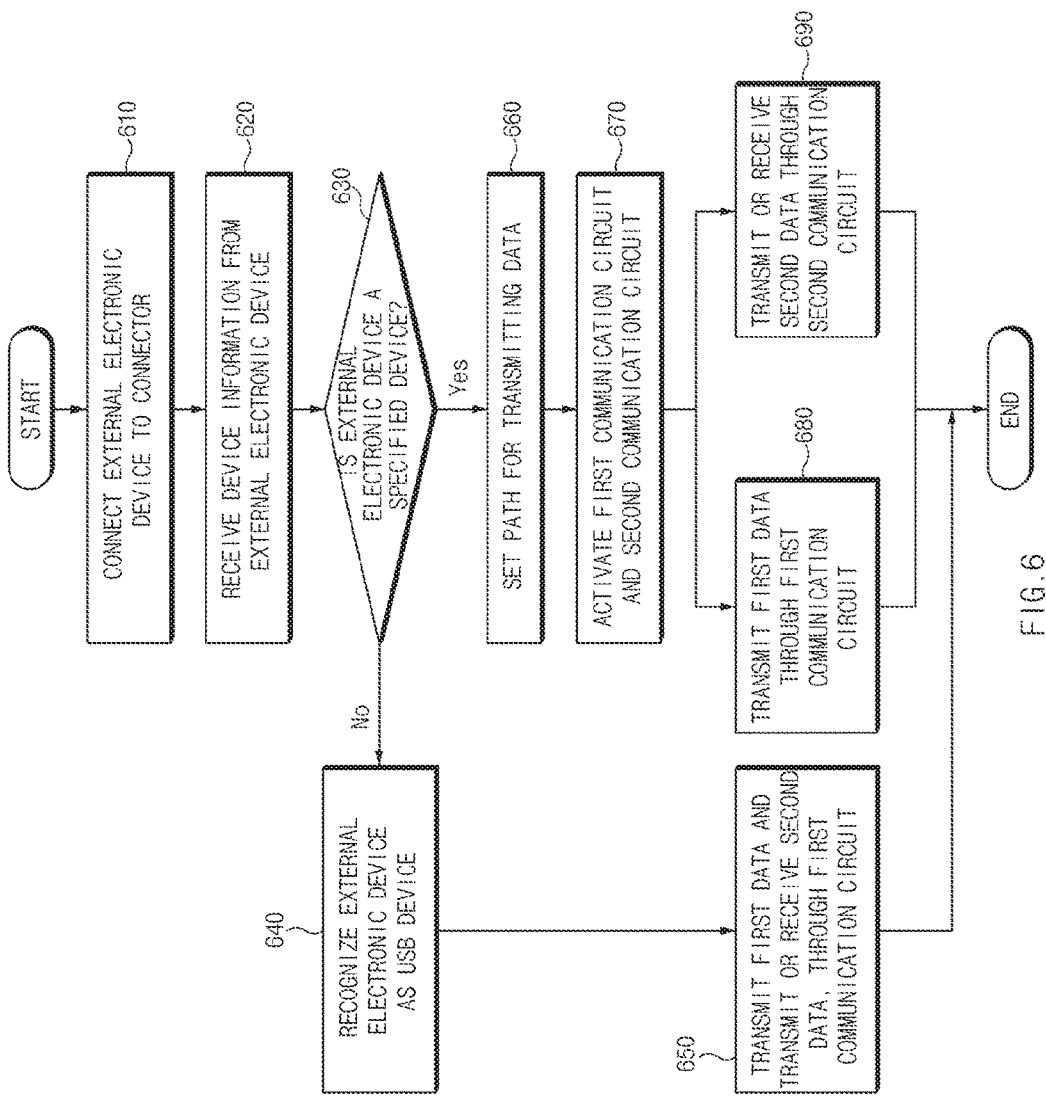
FIG. 6 is a flowchart illustrating an example data transceiving method of a first electronic device, according to various example embodiments of the present disclosure.

FIG. 6 is a flowchart illustrating an example data transceiving method of a first electronic device, according to various example embodiments of the present disclosure.

The flowchart illustrated in FIG. 6 may comprise operations processed in the first electronic device 100 illustrated in FIG. 2. Thus, even though omitted below, a description about the first electronic device 100 described with reference to FIGS. 1 to 4 may be applied to the flowchart illustrated in FIG. 6.

According to an example embodiment, in operation 610, an external electronic device (e.g., the second electronic device 200) may be connected to a connector of the first electronic device 100. The first electronic device 100 and the second electronic device 200 may be connected with each other through a cable (e.g., the cable 210 of FIG. 1) connected with the second electronic device 200. For example, the cable may be implemented to be separable from the second electronic device 200 or may be integrated with the second electronic device 200. According to an embodiment, the cable may include a connector (e.g., the connector 205 of FIG. 1). A USB connector may be, for example, a USB Type-C connector.

According to an embodiment, in operation 620, the first electronic device 100 (e.g., the connection configuration module 140) may receive device information from the external electronic device. For example, if the external electronic device is connected to the first electronic device 100, the first electronic device 100 may receive information (e.g., a VID, a PID, or the like) about the external electronic device from the external electronic device in a process for the alternate mode connection.

According to an embodiment, in operation 630, the first electronic device 100 (e.g., the connection configuration module 140) may determine whether the external electronic device is a specified device (e.g., the second electronic device 200), by using the received information. According to an embodiment, if the external electronic device is the specified device, the first electronic device 100 may transmit information about the external electronic device to the switch 150 and the processor 170. According to an embodiment, the first electronic device 100 may transmit a mode entrance message to the external electronic device. If a response to the mode entrance message is received, the first electronic device 100 may operate in an alternate mode.

According to an embodiment, if the external electronic device is not the specified device, in operation 640, the first electronic device 100 (e.g., the processor 170) may recognize the external electronic device as a USB device. According to an embodiment, the first electronic device 100 may perform USB enumeration (an enumeration task) to proceed to a process for operating as a USB host device.

According to an embodiment, in operation 650, the first electronic device 100 (e.g., the processor 170) may transmit first data and may transmit or receive second data, through the first communication circuit 110. The first data may be transmitted to the external electronic device through, for example, the first communication circuit 110 and the first data pin of the connector 130. The second data may be transmitted to the external electronic device through, for example, the first communication circuit 110 and a second data pin of the connector 130 or may be received from the external electronic device.

According to an embodiment, in operation 660, if the external electronic device is the specified device, the first electronic device 100 (e.g., the switch 150) may set a path for transmitting data. For example, the first electronic device 100 may connect the first communication circuit 110 and the second communication circuit 120 to a first data pin (e.g., Tx+ data pin or Tx− data pin) and a second data pin (e.g., D+ data pin or D− data pin) of connectors, respectively. According to an embodiment, the first electronic device 100 may change a communication circuit, to which the second data pin of the connector 130 is connected, based on a type of the external electronic device connected to the connector 130. According to an embodiment, the specified external electronic device (e.g., the second electronic device 200) is connected to the connector 130, the first electronic device 100 may connect the second data pin of the connector 130 to the second communication circuit 120 (e.g., the second USB communication circuit 121). According to an embodiment, if the external electronic device is not connected to the connector 130 or if another electronic device (e.g., USB memory device) other than the specified external electronic device is connected to the connector 130, the switch 150 may connect the second data pin of the connector 130 to the first communication circuit 110 (e.g., the first USB communication circuit 111).

According to an embodiment, in operation 670, the first electronic device 100 (e.g., the processor 170) may activate (or initialize) the first communication circuit 110 and the second communication circuit 120. For example, the first electronic device 100 may activate the first communication circuit 110 and may activate a module that generates (or processes) the first data. As another example, the first electronic device 100 may activate the second communication circuit 120 to make a USB connection with the external electronic device by performing USB enumeration.

According to an embodiment, in operation 680, the first electronic device 100 (e.g., the processor 170) may transmit the first data through the first communication circuit 110. The first data may be transmitted to the external electronic device through, for example, the first communication circuit 110 and the first data pin of the connector 130.

According to an embodiment, in operation 690, the first electronic device 100 (e.g., the processor 170) may transmit or receive the second data through the second communication circuit. The second data may be transmitted or received through, for example, the second communication circuit 120 and the second data pin of the connector 130.

According to various example embodiments of the present disclosure, a data transceiving method of an electronic device may include verifying a type of an external electronic device connected with the electronic device through a connector, receiving or transmitting, if the external electronic device is an electronic device of a first type, data from or to the external electronic device through a first communication circuit and a second communication circuit, and receiving or transmitting, if the external electronic device is the electronic device of a second type, data from or to the external electronic device through the first communication circuit.

According to an example embodiment, the connector may include a first pin set and a second pin for receiving or transmitting data. The data transceiving method of the electronic device may further include connecting the first pin set to the first communication circuit and connecting the second pin to the second communication circuit, by using at least one switch if the external electronic device is the electronic device of the first type and connecting the first pin set and the second pin to the first communication circuit by using the at least one switch if the external electronic device is the electronic device of the second type.

According to an example embodiment, the data transceiving method of the electronic device may further include determining a mode for connection with the external electronic device as a first mode if the external electronic device is the electronic device of the first type and determining the mode for connection as a second mode if the external electronic device is the electronic device of the second type.

According to an example embodiment, the first mode may include an alternate mode, and the second mode may include a USB mode.

According to an example embodiment, the data transceiving method of the electronic device may further include performing a USB enumeration process with the external electronic device by using the first communication circuit if the mode for connection is the USB mode.

According to an example embodiment, the data transceiving method of the electronic device may further include performing a USB enumeration process with the external electronic device by using the second communication circuit if the mode for connection is the alternate mode.

According to an example embodiment, the receiving or transmitting of the data from or to the external electronic device through the first communication circuit and the second communication circuit if the external electronic device is the electronic device of the first type may include transmitting first data through the first communication circuit and receiving and transmitting second data through the second communication circuit.

According to an example embodiment, the first data may be video data, the second data may be motion data of the external electronic device. The data transceiving method of the electronic device may further include generating the video data based on the motion data.

Figure 7:
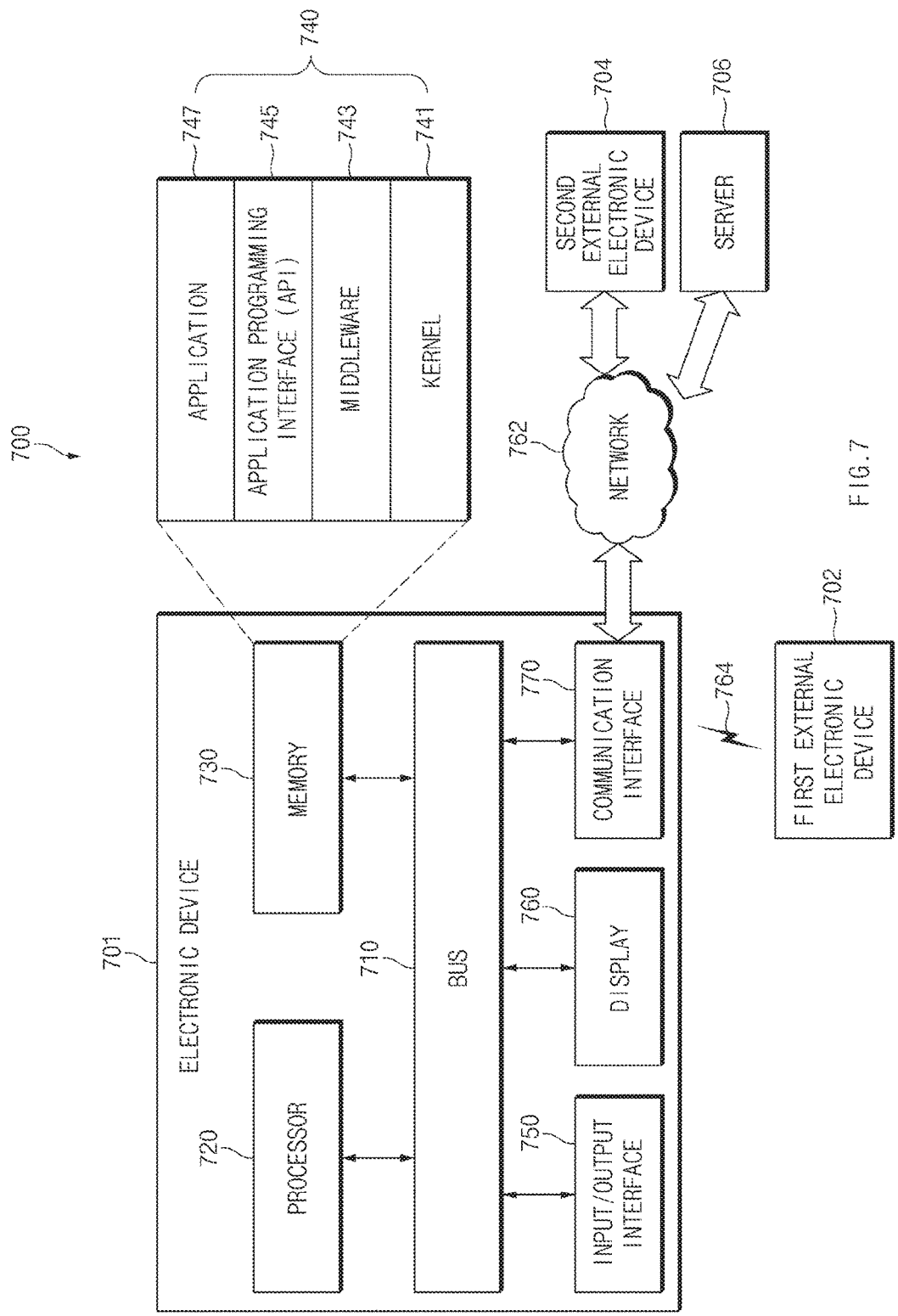
FIG. 7 is a diagram illustrating an example electronic device in a network environment, according to various example embodiments of the present disclosure.

FIG. 7 is a diagram illustrating an electronic device in a network environment according to an embodiment of the present disclosure.

An electronic device 701 in a network environment 700 according to various embodiments of the present disclosure will be described with reference to FIG. 7. The electronic device 701 may include a bus 710, a processor (e.g., including processing circuitry) 720, a memory 730, an input/output interface (e.g., including input/output circuitry) 750, a display 760, and a communication interface (e.g., including communication circuitry) 770. In various example embodiments of the present disclosure, at least one of the foregoing elements may be omitted or another element may be added to the electronic device 701.

The bus 710 may include a circuit for connecting the above-mentioned elements 710 to 770 to each other and transferring communications (e.g., control messages and/or data) among the above-mentioned elements.

The processor 720 may include various processing circuitry, such as, for example, and without limitation, at least one of a dedicated processor, a central processing unit (CPU), an application processor (AP), or a communication processor (CP), or the like. The processor 720 may perform data processing or an operation related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform operations or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may handle the one or more task requests according to the priority assigned to the at least one application, thereby performing scheduling or load balancing with respect to the one or more task requests.

The API 745, which is an interface for allowing the application 747 to control a function provided by the kernel 741 or the middleware 743, may include, for example, at least one interface or function (e.g., instructions) for file control, window control, image processing, character control, or the like.

The input/output interface 750 may include various input/output circuitry configured to serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may include various communication circuitry configured to set communications between the electronic device 701 and an external device (e.g., a first external electronic device 702, a second external electronic device 704, or a server 706). For example, the communication interface 770 may be connected to a network 762 via wireless communications or wired communications so as to communicate with the external device (e.g., the second external electronic device 704 or the server 706).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 764. The short-range communications may include at least one of wireless fidelity (Wi-Fi), Bluetooth, Bluetooth low energy (BLE), Zigbee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 762 may include at least one of telecommunications networks, for example, a computer network (e.g., local area network (LAN) or wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of operations performed in the electronic device 701 may be performed in one or more other electronic devices (e.g., the first electronic device 702, the second external electronic device 704, or the server 706). When the electronic device 701 should perform a certain function or service automatically or in response to a request, the electronic device 701 may request at least a portion of functions related to the function or service from another device (e.g., the first electronic device 702, the second external electronic device 704, or the server 706) instead of or in addition to performing the function or service for itself. The other electronic device (e.g., the first electronic device 702, the second external electronic device 704, or the server 706) may perform the requested function or additional function, and may transfer a result of the performance to the electronic device 701. The electronic device 701 may use a received result itself or additionally process the received result to provide the requested function or service. To this end, for example, a cloud computing technology, a distributed computing technology, or a client-server computing technology may be used.

Figure 8:
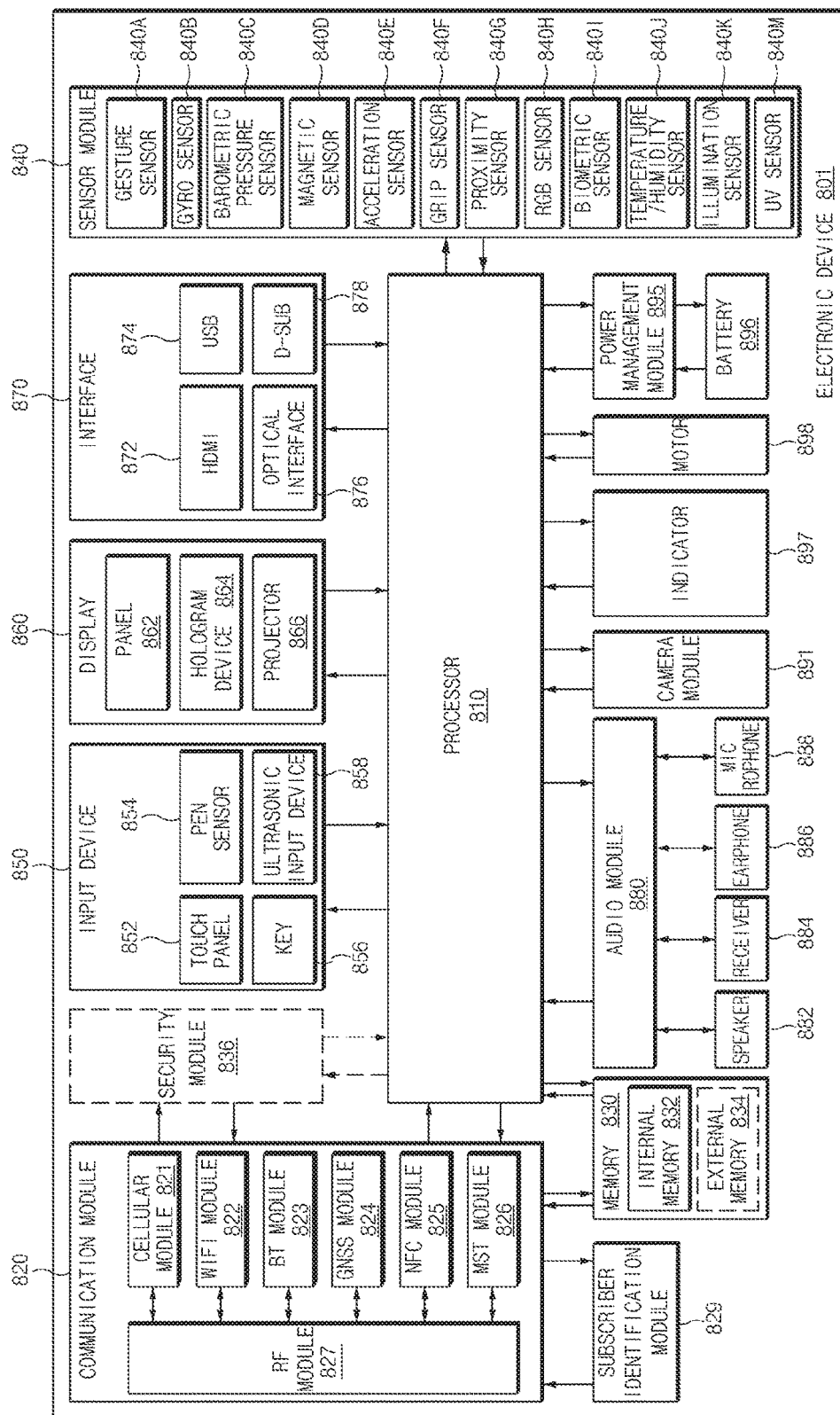
FIG. 8 is a block diagram illustrating an example electronic device, according to various example embodiments of the present disclosure.

FIG. 8 is a block diagram illustrating an example electronic device according to an example embodiment of the present disclosure.

Referring to FIG. 8, an electronic device 801 may include, for example, a part or the entirety of the electronic device 701 illustrated in FIG. 7. The electronic device 801 may include at least one processor (e.g., AP) (e.g., including processing circuitry) 810, a communication module (e.g., including communication circuitry) 820, a subscriber identification module (SIM) 829, a memory 830, a sensor module 840, an input device (e.g., including input circuitry) 850, a display 860, an interface (e.g., including interface circuitry) 870, a security module 836, an audio module 880, a camera module 891, a power management module 895, a battery 896, an indicator 897, and a motor 898.

The processor 810 may run an operating system or an application program so as to control a plurality of hardware or software elements connected to the processor 810, and may process various data and perform operations. The processor 810 may include various processing circuitry, such as, for example, and without limitation, a dedicate processor, a CPU, or the like, and may be implemented as, for example, a system on chip (SoC). According to an embodiment of the present disclosure, the processor 810 may further include a graphic processing unit (GPU) and/or an image signal processor. The processor 810 may include at least a portion (e.g., a cellular module 821) of the elements illustrated in FIG. 8. The processor 810 may load, on a volatile memory, an instruction or data received from at least one of other elements (e.g., a nonvolatile memory) to process the instruction or data, and may store various data in a nonvolatile memory.

The communication module 820 may include various communication circuitry and have a configuration that is the same as or similar to that of the communication interface 770 of FIG. 7. The communication module 820 may include various communication circuitry, such as, for example, and without limitation, one or more of a cellular module 821 (e.g., the modem), a Wi-Fi module 822, a Bluetooth module 823, a GNSS module 824 (e.g., a GPS module, a GLONASS module, a BeiDou module, or a Galileo module), an NFC module 825, a MST module 826 and a radio frequency (RF) module 827.

The cellular module 821 may provide, for example, a voice call service, a video call service, a text message service, or an Internet service through a communication network. The cellular module 821 may identify and authenticate the electronic device 801 in the communication network using the subscriber identification module 829 (e.g., a SIM card). The cellular module 821 may perform at least a part of functions that may be provided by the processor 810. The cellular module 821 may include a communication processor (CP).

Each of the Wi-Fi module 822, the Bluetooth module 823, the GNSS module 824, the NFC module 825 and the MST module 826 may include, for example, a processor for processing data transmitted/received through the modules. According to some various embodiments of the present disclosure, at least a part (e.g., two or more) of the cellular module 821, the Wi-Fi module 822, the Bluetooth module 823, the GNSS module 824, the NFC module 825 and the MST module 826 may be included in a single integrated chip (IC) or IC package.

The RF module 827 may transmit/receive, for example, communication signals (e.g., RF signals). The RF module 827 may include, for example, a transceiver, a power amp module (PAM), a frequency filter, a low noise amplifier (LNA), an antenna, or the like. According to another embodiment of the present disclosure, at least one of the cellular module 821, the Wi-Fi module 822, the Bluetooth module 823, the GNSS module 824, the NFC module 825 and the MST module 826 may transmit/receive RF signals through a separate RF module.

The SIM 829 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 830 (e.g., the memory 730) may include, for example, an internal memory 832 and/or an external memory 834. The internal memory 832 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 834 may include a flash drive such as a compact flash (CF), a secure digital (SD), a Micro-SD, a Mini-SD, an extreme digital (xD), a MultiMediaCard (MMC), a memory stick, or the like. The external memory 834 may be operatively and/or physically connected to the electronic device 801 through various interfaces.

A security module 836, which is a module including a storage space that is higher in security level than the memory 830, may be a circuit for securing safe data storage and protected execution circumstances. The security module 836 may be implemented with an additional circuit and may include an additional processor. The security module 836 may be present in an attachable smart chip or SD card, or may include an embedded secure element (eSE), which is installed in a fixed chip. Additionally, the security module 836 may be driven in another OS which is different from the OS of the electronic device 801. For example, the security module 836 may operate based on a Java card open platform (JCOP) OS.

The sensor module 840 may, for example, measure physical quantity or detect an operation state of the electronic device 801 and the convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 840 may further include a control circuit for controlling at least one sensor included therein. In some various embodiments of the present disclosure, the electronic device 801 may further include a processor configured to control the sensor module 840 as a part of the processor 810 or separately, so that the sensor module 840 is controlled while the processor 810 is in a sleep state.

The input device 850 may include various input circuitry, such as, for example, and without limitation, one or more of a touch panel 852, a (digital) pen sensor 854, a key 856, or an ultrasonic input device 858. The touch panel 852 may employ at least one of capacitive, resistive, infrared, and ultraviolet sensing methods. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone 888 so as to identify data corresponding to the ultrasonic waves sensed.

The display 860 (e.g., the display 760) may include a panel 862, a hologram device 864, or a projector 866. The panel 862 may have a configuration that is the same as or similar to that of the display 760 of FIG. 7. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 801. According to an embodiment of the present disclosure, the display 860 may further include a control circuit for controlling the panel 862, the hologram device 864, or the projector 866.

The interface 870 may include various interface circuitry, such as, for example, and without limitation, one or more of an HDMI 872, a USB 874, an optical interface 876, or a D-subminiature (D-sub) 878. The interface 870, for example, may be included in the communication interface 770 illustrated in FIG. 7. Additionally or alternatively, the interface 870 may include, for example, a mobile high-definition link (MHL) interface, an SD card/multi-media card (MMC) interface, or an infrared data association (IrDA) interface.

The audio module 880 may convert, for example, a sound into an electrical signal or vice versa. At least a portion of elements of the audio module 880 may be included in the input/output interface 750 illustrated in FIG. 7. The audio module 880 may process sound information input or output through a speaker 882, a receiver 884, an earphone 886, or the microphone 888.

The camera module 891 is, for example, a device for shooting a still image or a video. According to an embodiment of the present disclosure, the camera module 891 may include at least one image sensor (e.g., a front sensor or a rear sensor), a lens, an image signal processor (ISP), or a flash (e.g., an LED or a xenon lamp).

The power management module 895 may manage power of the electronic device 801. According to an embodiment of the present disclosure, the power management module 895 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), Media-FLO™, or the like.

Figure 9:
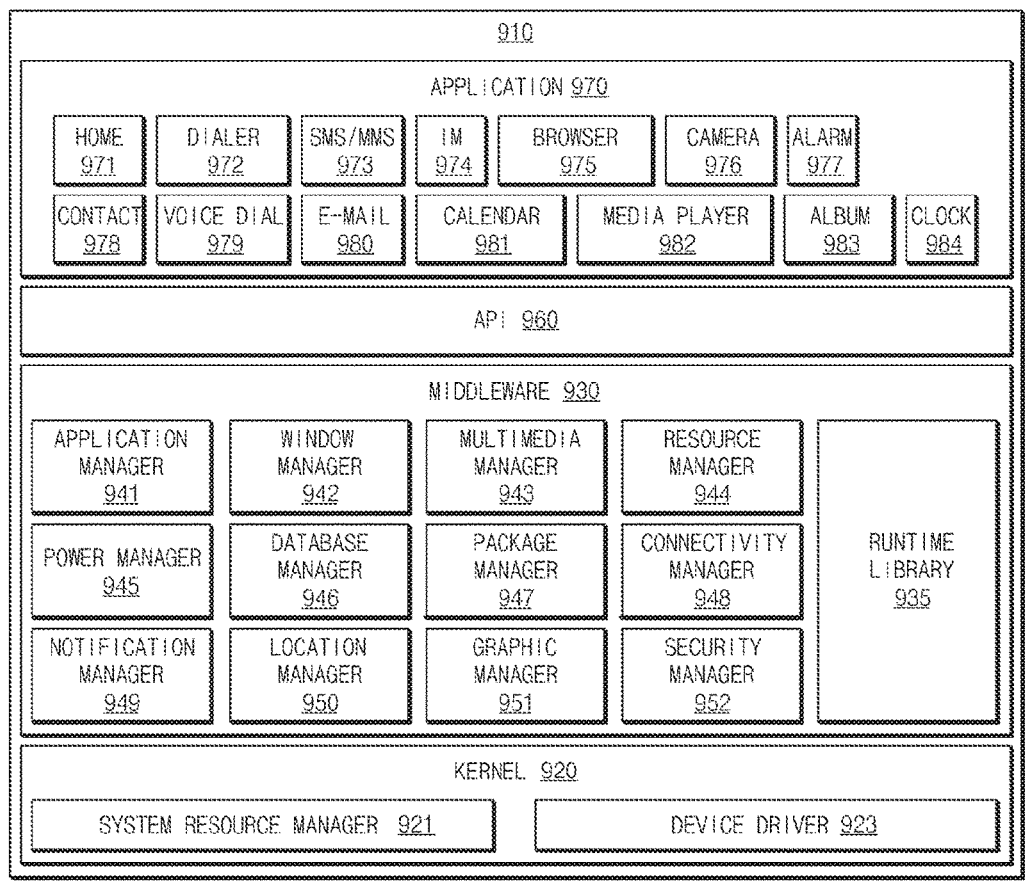
FIG. 9 is a block diagram illustrating an example program module according to various example embodiments of the present disclosure.

FIG. 9 is a block diagram illustrating an example program module according to an example embodiment of the present disclosure.

Referring to FIG. 9, a program module 910 (e.g., the program 740) may include an operating system (OS) for controlling a resource related to an electronic device (e.g., the electronic device 701) and/or various applications (e.g., the application program 747) running on the OS. The operating system may be, for example, Android, iOS, Windows, Symbian, Tizen, or the like.

The program module 910 may include a kernel 920, a middleware 930, an API 960, and/or an application 970. At least a part of the program module 910 may be preloaded on an electronic device or may be downloaded from an external electronic device (e.g., the first electronic device 702, the second external electronic device 704, or the server 706).

The kernel 920 (e.g., the kernel 741) may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 so that the applications 970 may efficiently use limited system resources in the electronic device. According to an embodiment of the present disclosure, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951 and a security manager 952.

The runtime library 935 may include, for example, a library module that a complier uses to add a new function through a programming language while the application 970 is running. The runtime library 935 may perform a function for input/output management, memory management, or an arithmetic function.

The application manager 941 may manage, for example, a life cycle of at least one of the applications 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the applications 970.

The power manager 945, for example, may operate together with a basic input/output system (BIOS) to manage a battery or power and may provide power information required for operating the electronic device. The database manager 946 may generate, search, or modify a database to be used in at least one of the applications 970. The package manager 947 may manage installation or update of an application distributed in a package file format.

The connectivity manger 948 may manage wireless connection of Wi-Fi, Bluetooth, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case in which an electronic device (e.g., the electronic device 701) includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an operating system to provide differentiated functions. Furthermore, the middleware 930 may delete a part of existing elements or may add new elements dynamically.

The API 960 (e.g., the API 745) which is, for example, a set of API programming functions may be provided in different configurations according to an operating system. For example, in the case of Android or iOS, one API set may be provided for each platform, and, in the case of Tizen, at least two API sets may be provided for each platform.

The application 970 (e.g., the application program 747), for example, may include at least one application capable of performing functions such as a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a clock 984, health care (e.g., measure an exercise amount or blood sugar), or environmental information provision (e.g., provide air pressure, humidity, or temperature information).

According to an embodiment of the present disclosure, the application 970 may include an information exchange application for supporting information exchange between the electronic device (e.g., the electronic device 701) and an external electronic device (e.g., the first electronic device 702 or the second external electronic device 704). The information exchange application may include, for example, a notification relay application for relaying specific information to the external electronic device or a device management application for managing the external electronic device.

For example, the notification relay application may have a function for relaying, to an external electronic device (e.g., the first electronic device 702 or the second external electronic device 704), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 702 or the second external electronic device 704) communicating with the electronic device, an application running in the external electronic device, or a service (e.g., a call service, a message service, or the like) provided from the external electronic device.

According to an embodiment of the present disclosure, the application 970 may include a specified application (e.g., a healthcare application of a mobile medical device) according to an attribute of the external electronic device (e.g., the first electronic device 702 or the second external electronic device 704). The application 970 may include an application received from an external electronic device (e.g., the first electronic device 702 or the second external electronic device 704). The application 970 may include a preloaded application or a third-party application downloadable from a server. The names of the elements of the program module 910 illustrated may vary with the type of an operating system.

According to various embodiments of the present disclosure, at least a part of the program module 910 may be implemented with software, firmware, hardware, or a combination thereof. At least a part of the program module 910, for example, may be implemented (e.g., executed) by a processor (e.g., the processor 210). At least a part of the program module 910 may include, for example, a module, a program, a routine, sets of instructions, or a process for performing at least one function.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, processing circuitry, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 720), the processor may perform functions corresponding to the instructions. The computer-readable storage medium may be, for example, the memory 730.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to certain example embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

According to various embodiments of the present disclosure, video data and additional data may be independently processed by transmitting and receiving con tent data and the additional data through different communication circuits. Accordingly, a user may be provided with a seamless service by guaranteeing a data transmission speed and a data processing speed.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a Universal Serial Bus (USB) connector comprising a configuration channel (CC) pin, a transmission (Tx) pin, and two data pins;
a first USB communication circuit connected to the Tx pin of the USB connector;
a second USB communication circuit connected to the USB connector; and
a switch circuitry comprising at least one switch;
a processor, wherein the processor is configured to:
verify identification information corresponding to an external electronic device connected with the electronic device through the CC pin;
when the external electronic device is verified as an electronic device of a first type based on the verified identification information, connect one of the two data pins to the second communication circuit via the switching circuitry, transmit video data to the external electronic device through the Tx pin using the first USB communication circuit, and receive sensor data from the external electronic device through the one of the two data pins connected to the second USB communication; and
when the external electronic device is verified as an electronic device of a second type based on the verified identification information, connect the one of the two data pins to the first USB communication circuit via the switching circuitry, and transceive data with the external electronic device through the Tx pin and the one of the two data pins via the first USB communication circuit.

2. The electronic device of claim 1, further comprising:
a connection configuration module operatively connected with the CC pin of the connector,
wherein the processor is configured to verify a type of the external electronic device based on the identification information received from the connection configuration module.

3. The electronic device of claim 1, wherein the first USB communication circuit comprises a first channel and a second channel that are capable of communicating with the external electronic device, and
wherein the processor is configured to transmit first data to the external electronic device using the first channel and to transmit or receive second data to or from the external electronic device using the second channel.

4. The electronic device of claim 1, wherein the second USB communication circuit comprises one channel that is capable of communicating with the external electronic device, and
wherein the processor is configured to receive second data from the external electronic device and to transmit the second data to the external electronic device, using the one channel.

5. The electronic device of claim 1, wherein the electronic device of the first type comprises a device that plays or outputs multimedia data, and
wherein the electronic device of the second type comprises a USB device.

6. The electronic device of claim 1, wherein the processor is configured to:
determine a mode for connection with the external electronic device as a first mode if the external electronic device is the electronic device of the first type; and
determine the mode for connection with the external device as a second mode if the external electronic device is the electronic device of the second type.

7. The electronic device of claim 6, wherein the first mode comprises an alternate mode, and
wherein the second mode comprises a USB mode.

8. The electronic device of claim 7, wherein the processor is configured to perform a USB enumeration process with the external electronic device using the first USB communication circuit if the mode for connection is the USB mode.

9. The electronic device of claim 7, wherein the processor is configured to perform a USB enumeration process with the external electronic device using the second USB communication circuit if the mode for connection is the alternate mode.

10. The electronic device of claim 1, wherein the processor is configured to transmit the video data through the first USB communication circuit and to receive the sensor data through the second USB communication circuit, if the external electronic device is the electronic device of the first type.

11. The electronic device of claim 10,
wherein the second data comprises motion data of the external electronic device, and
wherein the processor is configured to generate the video data based on the sensor data.

12. A method of transceiving data of an electronic device, the method comprising:
verifying a type of an external electronic device connected with the electronic device through a configuration channel (CC) pin of a connector;
when the external electronic device is verified as an electronic device of a first type based on the verified identification information, transmitting video data to the external electronic device through a transmission (Tx) pin of the connector using the first communication circuit, connecting one of two data pins of the connector to the second communication circuit, and receiving sensor data from the external electronic device through the connecting one of two data pins using the second communication circuit; and
when the external electronic device is verified as an electronic device of a second type based on the verified identification information, connecting the Tx pin and the one of two data pins to the first communication circuit, and transceiving data with the external electronic device through the one of two data pins and the Tx pin via the first communication circuit.

13. The method of claim 12, further comprising:
determining a mode for connection with the external electronic device as a first mode if the external electronic device is the electronic device of the first type; and
determining the mode for connection with the external electronic device as a second mode if the external electronic device is the electronic device of the second type.

14. The method of claim 13, wherein the first mode comprises an alternate mode, and
wherein the second mode comprises a USB mode.

15. The method of claim 14, further comprising:
performing a USB enumeration process with the external electronic device using the first communication circuit if the mode for connection is the USB mode.

16. The method of claim 14, further comprising:
performing a USB enumeration process with the external electronic device using the second communication circuit if the mode for connection is the alternate mode.

* * * * *